United States Patent
Di Luccio

(12) 
(10) Patent No.: US 6,224,157 B1
(45) Date of Patent: May 1, 2001

(54) ARTICULATION INTENDED PARTICULARLY FOR A MOTOR VEHICLE SEAT

(75) Inventor: Michel Di Luccio, Nogent sur Vernisson (FR)

(73) Assignee: Bertrond Faure Equipement SA, Boulogne (FR)

(*) Notice: Subject to any disclaimer, the term of this patent is extended or adjusted under 35 U.S.C. 154(b) by 0 days.

(21) Appl. No.: 09/359,641

(22) Filed: Jul. 26, 1999

(30) Foreign Application Priority Data

Jul. 27, 1998 (FR) .................................................. 98 09570

(51) Int. Cl.$^7$ ....................................................... B60N 2/22
(52) U.S. Cl. ........................... 297/362; 192/15; 192/223.1
(58) Field of Search ............................... 297/362; 192/15, 192/223.1

(56) References Cited

U.S. PATENT DOCUMENTS

| | | | |
|---|---|---|---|
| 5,127,286 | * | 7/1992 | Wittig ............................... 297/362 X |
| 5,368,363 | * | 11/1994 | Sakamoto ............................. 297/362 |
| 5,462,498 | * | 10/1995 | Lindblad ........................... 297/362 X |
| 5,881,854 | * | 3/1999 | Rougnon-Glasson ................... 192/15 |

FOREIGN PATENT DOCUMENTS

| | | |
|---|---|---|
| 37 29 134 | 3/1989 | (DE) . |
| 584 589 | 3/1994 | (EP) . |
| 636 510 | 2/1995 | (EP) . |
| 694 434 | 1/1996 | (EP) . |
| 2 218 627 | 11/1989 | (GB) . |
| 92/20548 | 11/1992 | (WO) . |
| 94/00314 | 1/1994 | (WO) . |

* cited by examiner

*Primary Examiner*—Peter R. Brown
(74) *Attorney, Agent, or Firm*—Sughrue, Mion, Zinn, Macpeak & Seas, PLLC

(57) ABSTRACT

This articulation comprises two coaxial annulus gears with internal sets of teeth (20, 22) of different pitch, one stationary and the other mobile, meshing with at least one planet (S1 to S4) bearing two external sets of teeth (24, 26) capable of mating with the internal sets of teeth (20, 22). The external set of teeth (26) that mates with the mobile internal set of teeth (22) extends over a shorter sector than the other external set of teeth (24), which means that the planet (S1 to S4) can move over a travel in which its two external sets of teeth (24, 26) are in mesh with the two internal sets of teeth (20, 22), between two end-of-travel positions beyond which the stationary internal set of teeth (20) is kept in mesh with the mating external set of teeth (24) while the other external set of teeth (26) is disengaged from the mobile internal set of teeth (22).

10 Claims, 4 Drawing Sheets

ARTICULATION INTENDED PARTICULARLY FOR A MOTOR VEHICLE SEAT

BACKGROUND OF THE INVENTION

The present invention relates to an articulation intended particularly for a motor vehicle seat.

The state of the art already knows an articulation of the type with parallel gears comprising two coaxial annulus gears with internal sets of teeth of different pitch, one stationary and the other mobile, meshing with at least one planet bearing two external sets of teeth that mate with the internal sets of teeth and are off-centred with respect to these internal sets of teeth, the axis of the articulation coinciding with the axis of the annulus gears.

An articulation of this type is advantageously used in a motor vehicle seat to connect the seat cushion and the backrest of the seat together. The stationary and mobile annulus gears are, respectively, as one with the seat cushion and with the backrest. The articulation allows the inclination of the backrest with respect to the seat cushion to be adjusted continuously.

Customarily, the articulation is operated by an operating knob which the user turns in the desired direction in order to adjust the inclination of the backrest. The articulation allows very accurate infinitesimal continuous adjustment of the inclination of the backrest, without the user having to exert a significant amount of torque on the operating knob because of the high degree of demultiplication obtained by the gearing of the articulation.

However, when the user wishes to move the backrest through a large angle, for example to bring it from a normal, roughly vertical position into a reclined, roughly horizontal position, he or she has to turn the operating knob through a great many turns, which is a lengthy and irksome operation.

SUMMARY OF THE INVENTION

The object of the invention is to propose an articulation which allows very precise infinitesimal adjustment without thereby making it necessary, in the application to a seat mentioned above, to perform numerous rotations of the operating knob in order to move the backrest through a large angle.

To this end, the subject of the invention is an articulation of the aforementioned type, characterized in that the external set of teeth capable of mating with the mobile internal set of teeth extends over a shorter sector than the other external set of teeth, which means that the planet can move over an angular travel in which its two external sets of teeth mesh with the two mating internal sets of teeth, between two end-of-travel positions beyond which the stationary internal set of teeth is kept in mesh with the mating external set of teeth while the other external set of teeth is disengaged from the mating mobile internal set of teeth.

According to other features of this articulation:

the planet is mounted so that it can pivot about an axis of pivoting distant from the axis of the articulation, on a support which rotates as one with a member for operating the articulation which is mounted so that it can rotate about the axis of the articulation;

in the end-of-travel position, the planet collaborates with an elastic stop returning this planet to a position in which its two sets of external teeth are in mesh with the two mating sets of internal teeth;

the elastic stop is formed by a leaf spring borne by the planet support;

the elastic stop is formed by a spring of angular effect comprising an end caught on a pivot which is as one with the planet support embodying the axis of pivoting of this planet and a free end intended to collaborate with one or other of two opposed stops formed on the planet depending on which of the end-of-travel positions this planet is in;

the articulation comprises four planets distributed, on the one hand, uniformly about the axis of the articulation and, on the other hand, in two pairs of adjacent planets, at least one pair of planets comprising elastic return means urging the two planets of the pair in opposite directions;

the elastic return means comprise two springs with opposite angular effects, each caught (i.e., connected) on a corresponding planet and on a pivot which is as one with the planet support embodying the axis of pivoting of this corresponding planet;

the annulus gears are formed in the respectively stationary and mobile cheeks which between them delimit a housing for the planet.

Another subject of the invention is a motor vehicle seat of the type comprising a backrest connected to a seat cushion by an articulation of axis transverse to the seat, characterized in that the articulation is as defined above, the stationary annulus gear being as one with the seat cushion and the mobile annulus gear being as one with the backrest, the articulation thus allowing the inclination of the backrest with respect to the seat cushion to be adjusted continuously when the planet is between its two end-of-travel positions and discontinuously when the planet reaches one or other of its end-of-travel positions.

According to another feature of this seat, the latter comprises means of elastically returning the backrest towards the front of the seat by rotation about the axis of the articulation.

BRIEF DESCRIPTION OF THE DRAWINGS

The invention will be better understood by reading the description which will follow, given merely by way of example and made with reference to the drawings, in which.

DETAILED DESCRIPTION OF THE INVENTION

Figure 1:
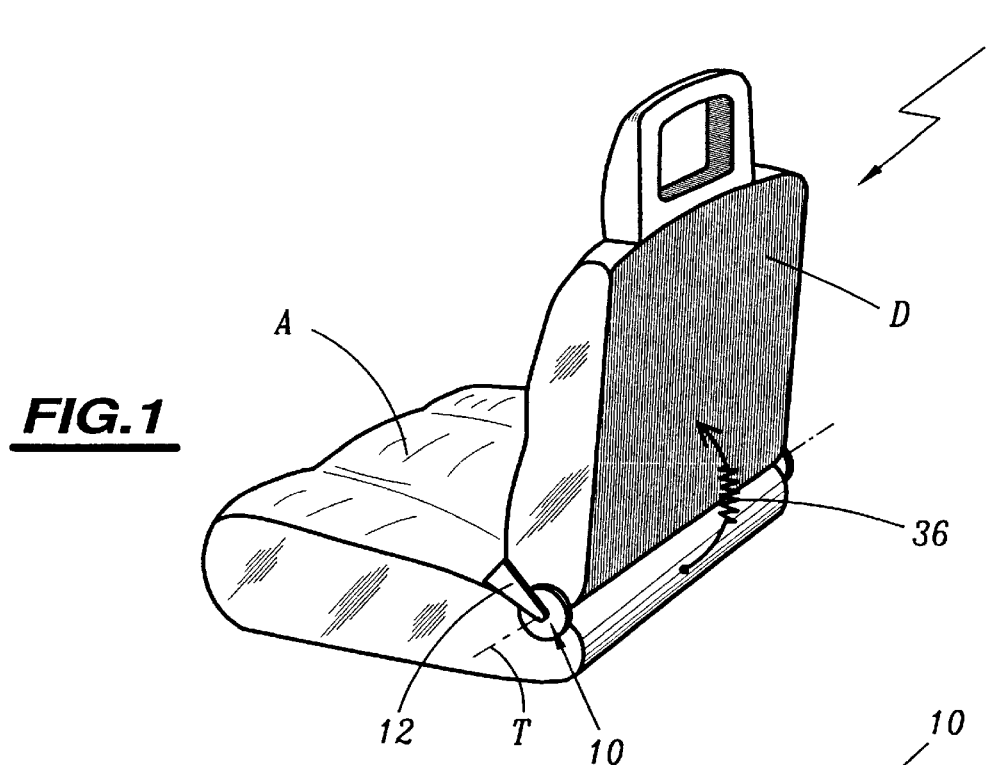
FIG. 1 is a perspective view of a seat for a motor vehicle, fitted with at least one articulation according to the invention.

Depicted in FIG. 1 is a seat E for a motor vehicle comprising a backrest D connected to a seat cushion A by two articulations 10 according to the invention having an axis T transverse to the seat.

Each articulation 10 is a mirror image of the other.

The articulations 10 are preferably operated jointly by a lever handle 12.

Figure 2:
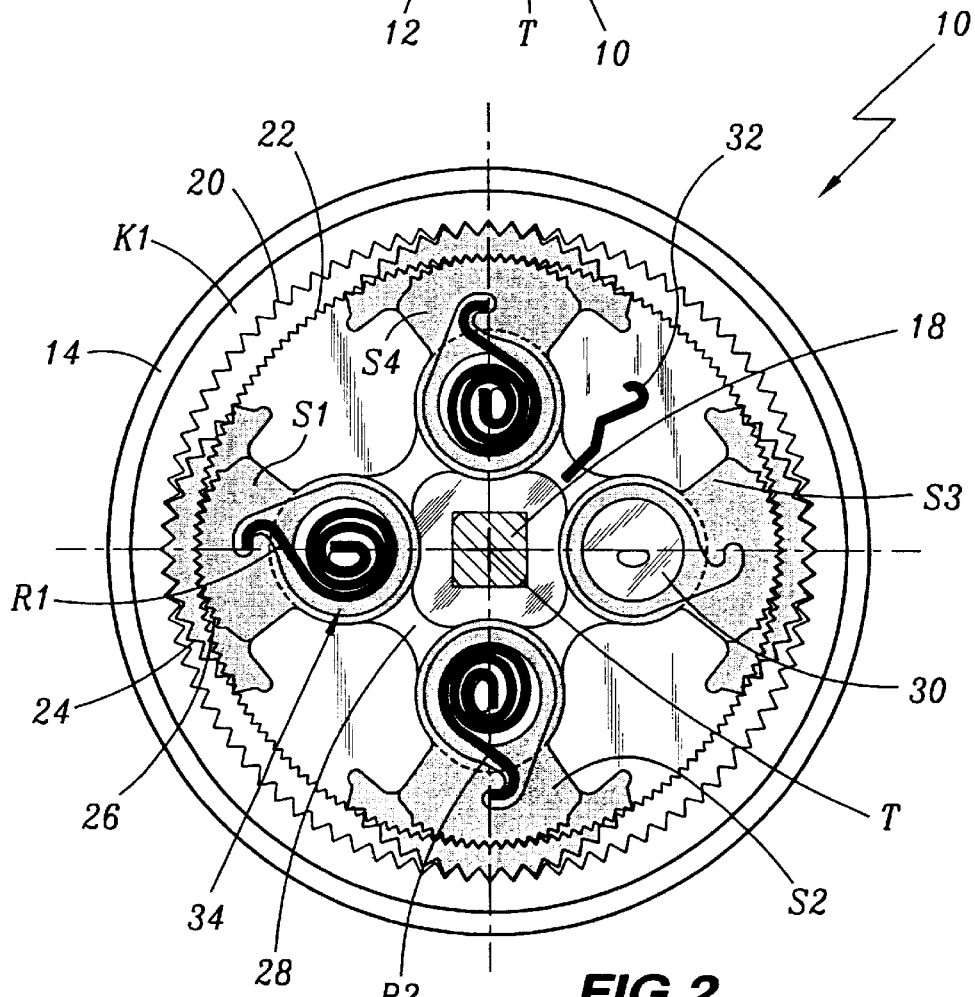
FIG. 2 is a front view of an articulation of the seat depicted in the previous figure, with the mobile cheek cut away to reveal the inside of the articulation.
Figure 3:
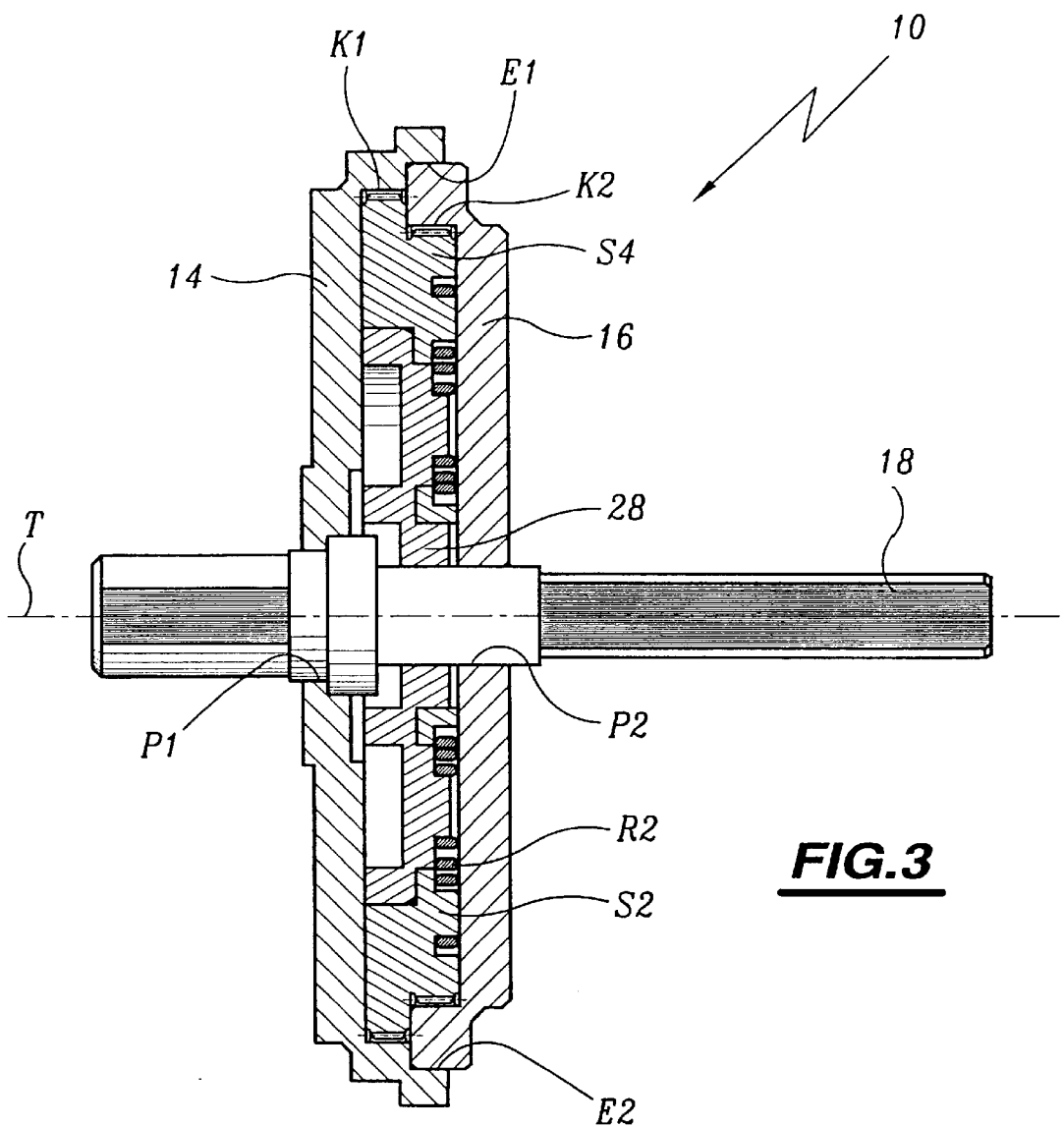
FIG. 3 is a view in axial section of the articulation depicted in FIG. 2.

Referring in particular to FIGS. 2 and 3 in which an articulation 10 has been depicted in greater detail, it can be seen that this articulation is of the type with parallel gears and comprises two cheeks, stationary 14 and mobile 16, of circular overall shape. The stationary cheek 14 is as one with the seat cushion A. The mobile cheek 16 is as one with the backrest D.

The cheeks 14, 16 are mounted so that they rotate one with respect to the other about the axis T, are held against one another in a way known per se, and are centred with respect to one another by complementary peripheral shoulders E1, E2 coaxial with the axis T.

The cheeks 14, 16 delimit between them a housing for gears that couple these cheeks and which will be described later. These gears are operated by a member 18 forming a spindle, on which the operating lever handle 12 is fixed in a way known per se.

The operating member 18 is mounted so that it can rotate about the axis T, being borne for example by bearings P1, P2 formed in the cheeks 14,16.

The operating member 18 can be actuated, via the lever handle 12, in two opposite directions so as to adjust the inclination of the backrest D with respect to the seat cushion A towards the front or the rear of the seat.

The operating members 18 of the two articulations 10 are connected by a conventional coupling device.

Figure 5:
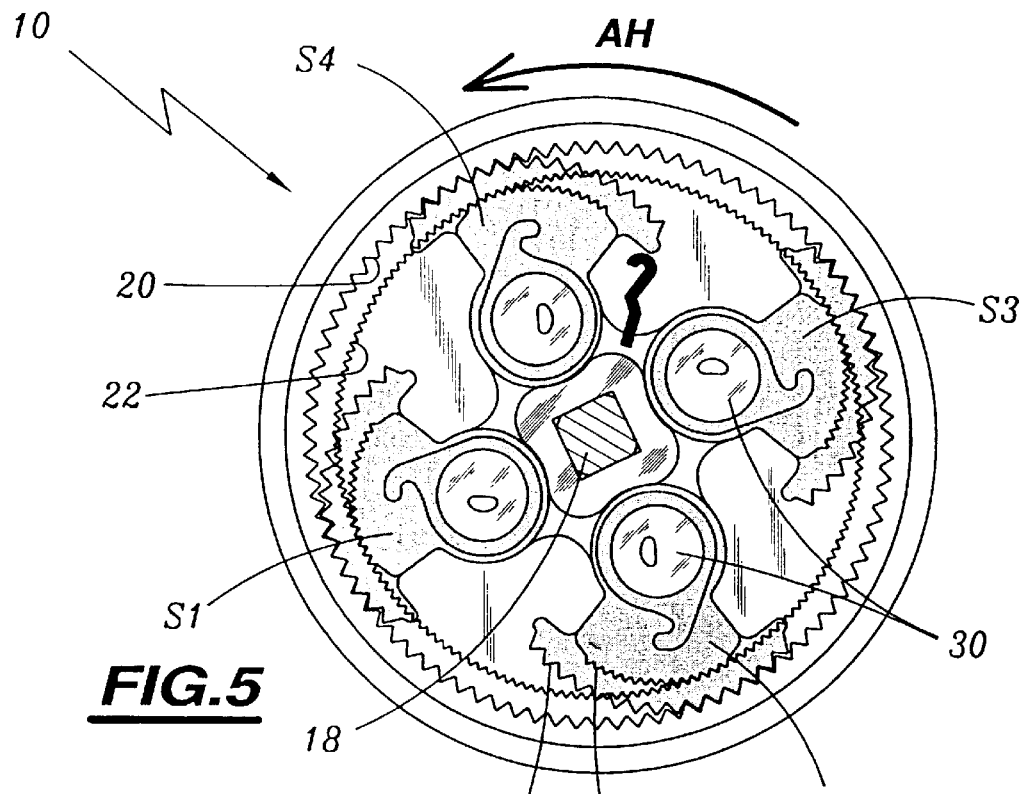
FIGS. 5 and 6 are views similar to FIG. 2, in two successive configurations of the articulation during a manoeuvre for adjusting the inclination of the backrest.
Figure 6:
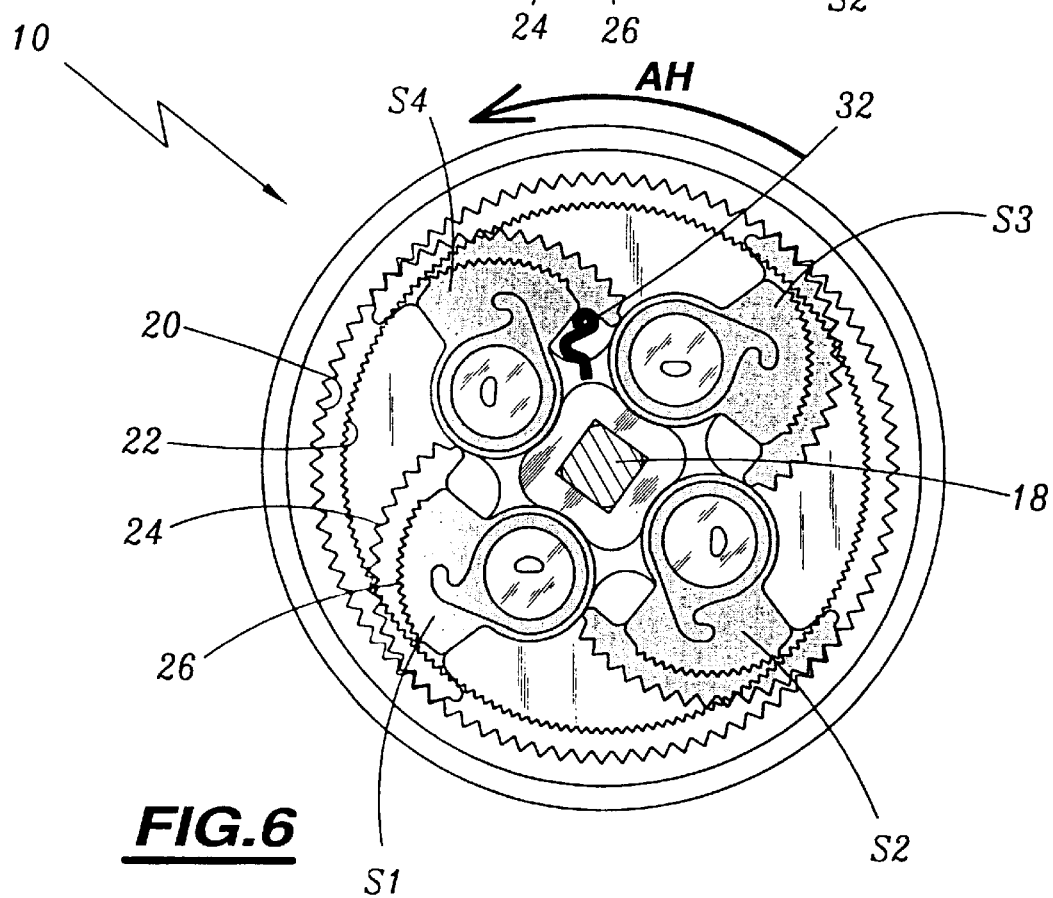

The coupling gearing comprises two coaxial annulus gears K1, K2 with internal sets of teeth 20, 22 of different pitch. The first annulus gear K1 is formed in the stationary cheek 14. The second annulus gear K2 is formed in the mobile cheek 16. For reasons of clarity, only the outline of the set of teeth 22 of the mobile annulus gear K2 is depicted in FIGS. 2, 5 and 6. The axis of the annulus gears K1, K2 coincides with the axis T of the articulation.

The two annulus gears K1, K2 mesh with at least one planet, preferably four planets S1 to S4 as in the example illustrated, each bearing two external sets of teeth 24, 26 capable of mating with the internal sets of teeth 20, 22 and are off-centered with respect to these internal sets of teeth 20, 22.

The four planets S1 to S4 housed between the cheeks 14, 16 and distributed uniformly about the axis T are borne by a support 28, in the overall shape of a cross, which rotates as one with the operating member 18.

Each planet S1 to S4 is mounted so that it can pivot on the support 28 about an axis of pivoting, distant from the axis T, embodied by a pivot 30 as one with this support 28.

Figure 4:
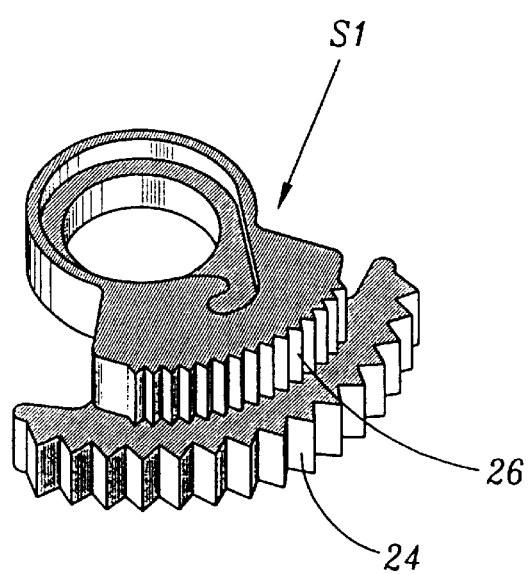
FIG. 4 is a perspective view of a planet of the articulation depicted in FIGS. 2 and 3.

Considering any planet S1 to S4, for example the planet S1 depicted in greater detail in FIG. 4, it can be seen that the external set of teeth 26 capable of mating with the mobile internal set of teeth 22 extends over a shorter sector than the other external set of teeth 24. As a result of this, the planet S1 to S4 can be moved over an angular travel in which its two external sets of teeth 24, 26 are in mesh with the two mating internal sets of teeth 20, 22, as is depicted in particular in FIG. 5. This meshing travel extends between two end-of-travel positions beyond which the fixed internal set of teeth 20 is kept in mesh with the mating external set of teeth 24 of the planet while the other external set of teeth 26 of the planet is disengaged from the mating mobile internal set of teeth 22, as is depicted in FIG. 6.

Considering this FIG. 6, in which all of the planets are in a first end-of-travel position, it can be seen that the planet S4 collaborates with a leaf spring 32 anchored in the support 28. This leaf spring 32 forms an elastic stop returning the planet S4 towards a position in which both its external sets of teeth 24, 26 are in mesh with the two mating internal sets of teeth 20, 22.

The elastic return movement imparted to a planet by the leaf spring is of course transmitted to the other planets borne by the common support 28 and which mesh with the common stationary annulus gear K1.

When the planets S1 to S4 are in their second end-of-travel position (not depicted), which is the opposite position from the one illustrated in FIG. 6, the planet S3 butts against the leaf spring 32 and this, all things being equal, brings about the same return effects as those described in the case of the first end-of-travel position of the planets.

In order to take up any backlash between the various sets of teeth, the planets S1 to S4 are distributed in two pairs of adjacent planets, each pair of planets comprising elastic return means 34 urging the planets of the pair towards each other.

As a preference, the elastic return means 34 comprise flat spiral springs R1, R2 with opposed angular effects. The articulation 10 therefore comprises four flat spiral springs, just three of which are depicted in FIG. 2.

Each flat spiral spring R1, R2 is caught on a corresponding planet S1 to S4 and a corresponding pivot 30.

The backrest D is returned elastically about the axis T towards the front of the seat by conventional elastic return means 36 depicted diagrammatically in FIG. 1.

The essential points of the operation of the articulation and of the seat according to the invention will be specified below.

Initially, the articulation 10 is at rest in the configuration illustrated in FIG. 2. The two external sets of teeth 24, 26 of the planets are in mesh with the two internal sets of teeth 20, 22 of the annulus gears K1, K2. The cheeks 14, 16 are therefore coupled together by the planets S1 to S4.

When the user wishes to alter the inclination of the backrest D with respect to the seat cushion A, he or she operates the lever handle 12 to drive the operating member 18 in a desired direction, for example in the anticlockwise direction depicted by an arrow AH in FIGS. 5 and 6.

The planets S1 to S4 each move in their angular travel in which the two external sets of teeth 24,26 are in mesh with the two mating sets of teeth 21, 22 of the annulus gears K1, K2. Because of the different pitches of the two sets of teeth K1, K2, the mobile cheek 16 moves relative to the stationary cheek 14, thereby altering the inclination of the backrest D, in a continuous and infinitesimal fashion.

As the operating member 18 continues to be rotated in its anticlockwise direction AH, the planets S1 to S4 reach the end-of-travel position as depicted in FIG. 6. Beyond this end-of-travel position, the planets S1 to S4 are disengaged from the mobile annulus gears K2, which means that the cheeks 14, 16 are uncoupled.

The backrest D can then pivot freely about the axis T. The user can thus very quickly vary the inclination of the backrest D, either by pressing the backrest backwards to counter the elastic return force of the means 36, or by leaning forwards away from this backrest to encourage the action of these return means 36, depending on the direction in which the inclination is to be adjusted.

When the backrest reaches the desired position, the user releases the lever handle 12, which allows the planets S1 to S4 to mesh once more with the two annulus gears K1, K2 simultaneously, under the effect of the elastic return force of the leaf spring 32. The cheeks 14, 16 are once more coupled together and continuous infinitesimal adjustment of the inclination of the backrest is once more possible.

It will be noted that the user is alerted to the change from continuous adjustment (planets in mesh with both annulus gears simultaneously) to discontinuous adjustment (planets in mesh with just the stationary annulus gear) by the resistance he or she encounters when one of the planets, reaching its end-of-travel position, butts up against the leaf spring 32.

Figure 7:
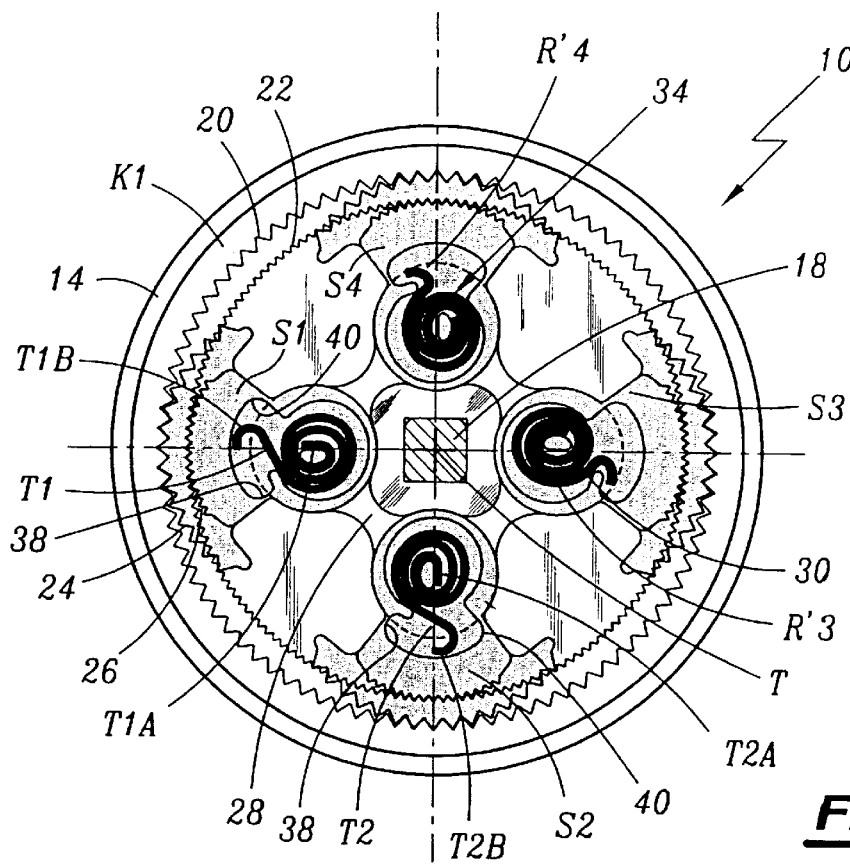
FIGS. 7 and 8 are views similar to FIGS. 2 and 6, respectively, showing an alternative form of the articulation according to the invention.
Figure 8:
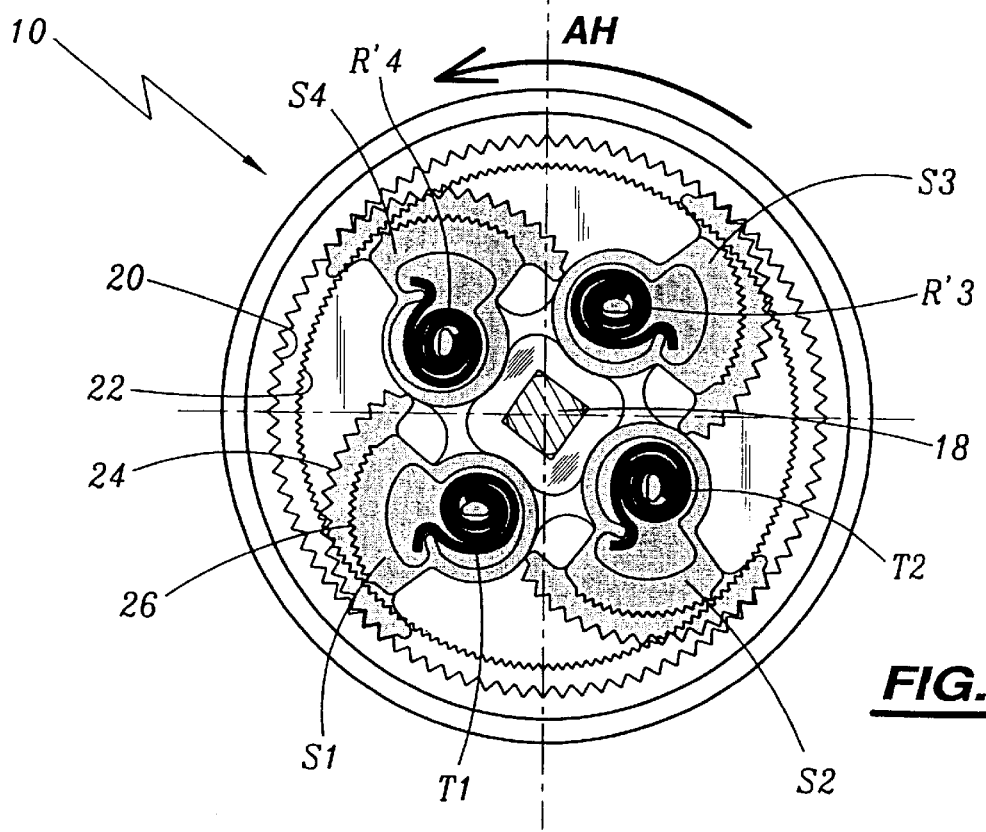

FIGS. 7 and 8 depict an alternative form of the articulation 10. In these FIGS. 7 and 8, the elements which are similar to those in the preceding figures are denoted by identical references.

In this alternative form, the articulation 10 comprises just one pair of planets S3, S4 equipped with elastic return means 34 urging the planets of this pair away from each other. These return means 34 comprise two flat spiral springs R'3, R'4 with opposed angular effects which, in contrast to the case illustrated in the preceding figures, urge the respective planets S3, S4 away from each other.

In this alternative form, too, the leaf spring 32 forming an elastic stop is replaced by at least one spring with angular effect, preferably two flat spiral springs T1, T2 associated, with the planets S1, S2, respectively.

Each spring T1, T2 has one end T1A, T2A caught (i.e., connected) on the pivot 30 of the corresponding planet and a free end T1B, T2B intended to collaborate with one or other of two opposed stops 38, 40 formed on the corresponding planet S1, S2, depending on which of its end-of-travel positions this planet is in.

It will therefore be noted that the two flat spiral springs R'3, R'4 are constantly in mesh with the corresponding planets S3, S4, whereas the free ends of the springs T1, T2 are sometimes disengaged from the corresponding planets S1, S2, particularly when the articulation is at rest, as is depicted in FIG. 7, and sometimes pressed against the stops 38, 40 of the corresponding planets S1, S2, particularly when these are in their end-of-travel position depicted in FIG. 8.

The invention is not restricted to the embodiment described above.

In particular, the internal sets of teeth of the annulus gears do not necessarily extend right around the circumference of these annulus gears and may possibly be interrupted over certain sectors.

Among the advantages of the invention, mention may be made of the following:

The articulation according to the invention, in its application to a seat as described above, makes it possible to adjust the inclination of the backrest with respect to the seat cushion continuously and infinitesimally when the planets are between their two end-of-travel positions and discontinuously and quickly when the planets have reached one or other of their end-of-travel positions.

Moreover, the two types of adjustments, continuous and discontinuous, are obtained with an articulation that comprises a small number of parts, it being possible for the number of planets to be less than four, or even reduced to just one.

Finally, the elastic return means urging two adjacent planets towards each other make it possible to automatically take up any backlash between the various sets of teeth in the articulation.

What is claimed is:

1. Articulation of the type with parallel gears comprising two coaxial annulus gears (K1, K2) with internal sets of teeth (20, 22) of different pitch, one stationary and the other mobile, meshing with at least one planet (S1 to S4) bearing two external sets of teeth (24, 26) that mate with the internal sets of teeth (20, 22) and are off-centred with respect to these internal sets of teeth (20, 22), the axis (T) of the articulation coinciding with the axis of the annulus gears (K1, K2), wherein the external set of teeth (26) capable of mating with the mobile internal set of teeth (22) extends over a shorter sector than the other external set of teeth (24), so that the at least one planet (S1 to S4) can move over an angular travel in which its two external sets of teeth (24, 25) mesh with the two mating internal sets of teeth (20, 22), between two end-of-travel positions beyond which the stationary internal set of teeth (20) is kept in mesh with the mating external set of teeth (24) while the other external set of teeth (26) is disengaged from the mating mobile internal set of teeth (22).

2. Articulation according to claim 1, wherein the at least one planet (S1, S4) is mounted so that it can pivot about an axis of pivoting distant from the axis (T) of the articulation, on a support (28) which rotates as one with a member (18) for operating the articulation which is mounted so that it can rotate about the axis (T) of the articulation.

3. Articulation according to claim 2, wherein, in the end-of-travel position, the at least one planet (S1, S4) collaborates with an elastic stop (32) returning this planet to a position in which its two sets of external teeth (24, 26) are in mesh with the two mating sets of internal teeth (20, 22).

4. Articulation according to claim 3, wherein the elastic stop (32) is formed by a leaf spring borne by the planet support (28).

5. Articulation according to claim 3, wherein the elastic stop (32) is formed by a spring (T1, T2) of angular effect comprising an end (T1A, T2A) connected on a pivot (30) which is as one with the planet support (28) embodying the axis of pivoting of this planet and a free end (T1B, T2B) intended to collaborate with one or other of two opposed stops (38, 40) formed on the planet depending on which of the end-of-travel positions this planet is in.

6. Articulation according to claim 1 comprising four planets (S1 to S4) distributed, on the one hand, uniformly about the axis (T) of the articulation and, on the other hand, in two pairs of adjacent planets, at least one pair of planets comprising elastic return means (34) urging the two planets of the pair in opposite directions.

7. Articulation according to claim 6, wherein the elastic return means (34) comprise two springs (R1, R2) with opposite angular effects, each connected on a corresponding planet (S1, S4) and on a pivot (30) which is as one with the planet support (28) embodying the axis of pivoting of this corresponding planet.

8. Articulation according to claim 1, wherein the annulus gears (K1, K2) are formed in the respectively stationary and mobile cheeks (14, 16) which between them delimit a housing for the at least one planet (S1 to S4).

9. A motor vehicle seat of the type comprising a backrest connected to a seat cushion by an articulation having an axis transverse to the seat, the articulation comprising two coaxial annulus gears with internal sets of teeth of different pitch, one stationary and the other mobile, meshing with at least one planet bearing two external sets of teeth that mate with the internal sets of teeth and are off-centred with respect to these internal sets of teeth, the axis of the articulation coinciding with the axis of the annulus gears, wherein the external set of teeth capable of mating with the mobile internal set of teeth extends over a shorter sector than the other external set of teeth, so that the at least one planet can move over an angular travel in which its two external sets of teeth mesh with the two mating internal sets of teeth, between two end-of-travel positions beyond which the stationary internal set of teeth is kept in mesh with the mating external set of teeth while the other external set of teeth is disengaged from the mating mobile internal set of teeth, the stationary annulus gear being fixed to the seat cushion and the mobile annulus gear being fixed to the backrest, the articulation thus allowing the inclination of the backrest with respect to the seat cushion to be adjusted continuously when the plant is between its two end-of-travel positions and discontinuously when the planet reaches one or other of its end-of-travel positions.

10. Seat according to claim 9, comprising means for elastically returning the backrest towards the front of the seat by rotation about the axis of the articulation, said means for elastically returning the backrest being interconnected and located between the backrest and the seat cushion.

* * * * *